United States Patent
Palandre et al.

(10) Patent No.: US 11,845,501 B2
(45) Date of Patent: Dec. 19, 2023

(54) METHOD FOR DISTRIBUTING A TORQUE TO A REDUNDANT SYSTEM BASED ON A BILATERAL COMPENSATION ARCHITECTURE

(71) Applicant: JTEKT EUROPE, Irigny (FR)

(72) Inventors: Xavier Palandre, Grezieu-la-Varenne (FR); Tahar Slama, Ecully (FR)

(73) Assignee: JTEKT EUROPE, Irigny (FR)

( * ) Notice: Subject to any disclaimer, the term of this patent is extended or adjusted under 35 U.S.C. 154(b) by 215 days.

(21) Appl. No.: 17/560,846

(22) Filed: Dec. 23, 2021

(65) Prior Publication Data

US 2022/0194463 A1 Jun. 23, 2022

(30) Foreign Application Priority Data

Dec. 23, 2020 (FR) .................................... 20/14015

(51) Int. Cl.
*B62D 5/04* (2006.01)

(52) U.S. Cl.
CPC ......... *B62D 5/0484* (2013.01); *B62D 5/0463* (2013.01); *B62D 5/0487* (2013.01)

(58) Field of Classification Search
CPC .. B62D 5/0484; B62D 5/0463; B62D 5/0487; H02P 5/00
See application file for complete search history.

(56) References Cited

FOREIGN PATENT DOCUMENTS

| EP | 1 426 266 A2 | 6/2004 |
|---|---|---|
| FR | 3 074 759 A1 | 6/2019 |
| WO | 2020/157431 A1 | 8/2020 |

OTHER PUBLICATIONS

Sep. 3, 2021 Search Report issued in French Patent Application No. 2014015.

*Primary Examiner* — Jacob M Amick
*Assistant Examiner* — Charles J Brauch
(74) *Attorney, Agent, or Firm* — Oliff PLC

(57) ABSTRACT

Method for controlling a control motor, including an engine and an engine arranged in parallel, implementing: a distribution step determining a distributed torque, and a distributed torque from a target torque; a step adding a compensation request to the first distributed torque so as to determine a target motor torque; a step adding a compensation request to the distributed torque so as to determine a target motor torque; a production step in which the engine exerts a motor torque depending on the target motor torque; a step in which the engine exerts a motor torque depending on the target motor torque; the controlling method also including a permission step, configured to limit, or respectively authorize, the compensation request of a disturbance, or respectively of a failure, of the engine, and/or the compensation request, for a disturbance, or respectively a failure, of the engine.

13 Claims, 1 Drawing Sheet

[Fig. 1]
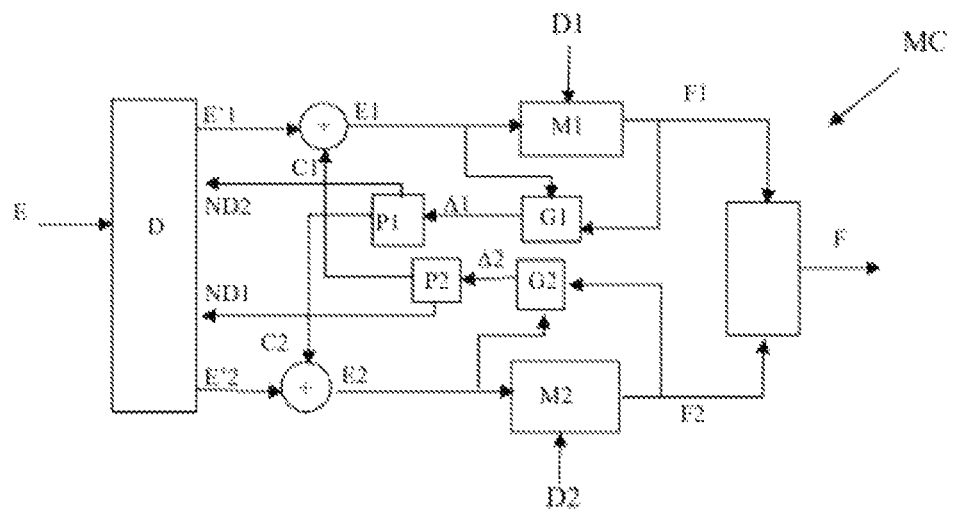
[Fig. 2]
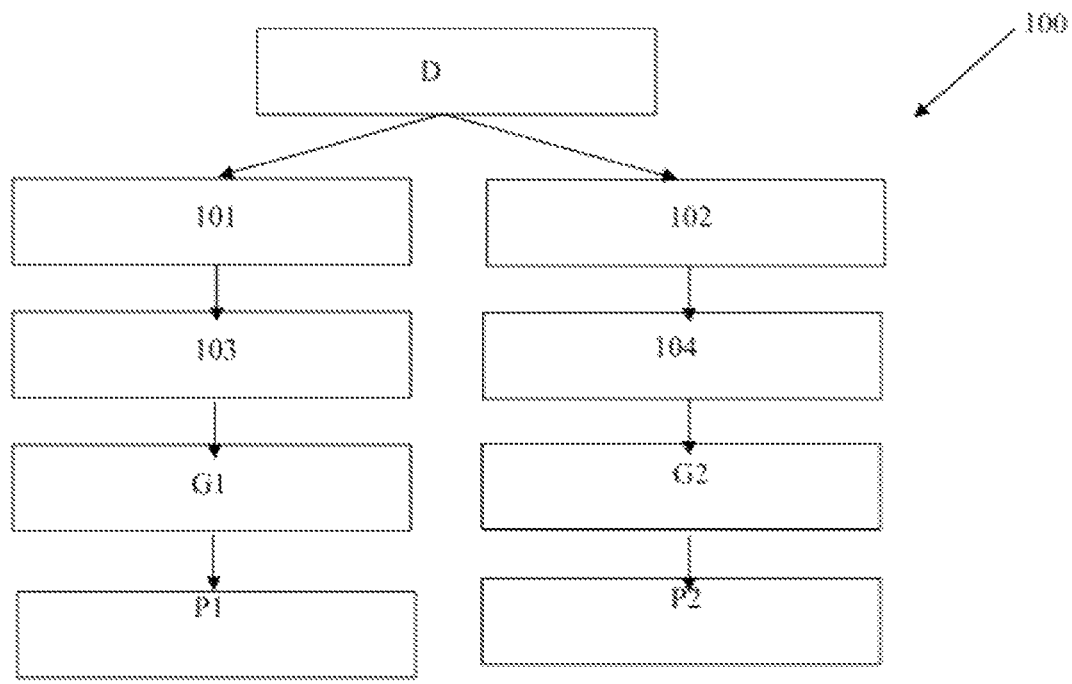

METHOD FOR DISTRIBUTING A TORQUE TO A REDUNDANT SYSTEM BASED ON A BILATERAL COMPENSATION ARCHITECTURE

The invention concerns the field of methods for controlling a control motor of a redundant mechatronic system, i.e. comprising at least two distinct engines, in particular for a power steering system.

The object of a vehicle power steering system is to allow a driver, or a computer in the case of autonomous vehicles, to control a vehicle trajectory by changing an angle of orientation of the vehicle wheels.

For this, the electric power steering system comprises a functional chain composed of at least one control motor exerting a torque on a single rack, or on the rack and on a steering wheel.

Generally, the control motor is an electric motor called «brushless» motor. The control motor receives as input a target torque to be exerted, that is to say a torque setpoint, and applies an exerted torque corresponding to a physical torque on the rack or on the steering wheel.

In the remainder of the description, and for ease of reading, the term «torque» is assimilated to a torque setpoint value. Only the terms «exerted torque» and «motor torque» represent a physical torque or the value of said physical torque.

The at least one control motor is part of the functional chain of the power steering system allowing the power steering system to be activated to ensure that the trajectory of the vehicle is followed. Thus, the safety of the occupants of the vehicle is linked to proper operation of the control motor.

In order to meet the safety requirement of the steering system for autonomous vehicles, it is necessary to integrate a control motor equipped with two distinct engines, that is to say a first engine and a second segregated engine, the two engines being autonomous, and arranged in parallel, each engine having its own power supply to guarantee the independence, receiving as input a target motor torque to be exerted, corresponding to a fraction of the target torque, and applying a motor torque. The engines can operate independently, and/or simultaneously.

Thus, the two engines have a redundant operation. In other words, the redundancy of the two engines is intended to ensure an ability to exert the target torque in order to guarantee the trajectory following performance.

For example, in the event of a permanent degradation judged to be of a safety nature of one of the two engines, that is to say a significant degradation calling into question the safety of the steering system such as, for example, a total failure of one of the two engines, the second engine will receive as input a target motor torque equal to the target torque in order to maintain the minimum availability necessary to exert the target torque. Likewise, a simple failure or disturbance in the control motor, which does not result in the total loss of one of the two engines, can lead to a degradation in the performance of the trajectory following and controllability of autonomous vehicles.

When the two engines are deemed to be functional, an optimized operation of the control motor is guaranteed both in terms of energy consumption and minimization of vibrations, by distributing the target torque over the two engines. The two engines receive a fraction of the target torque as input. The two engines then operate simultaneously so that their global behavior is comparable to a single engine. The two engines each provide a motor torque whose sum is equal to the exerted torque and substantially corresponds to the target torque.

Generally, in normal operation, the motor torque is substantially equal to the target motor torque. However, the motor torque produced by the engine in question may exhibit a deviation from the requested target motor torque. This deviation may be the cause of a limitation of the maximum available motor torque that can be exerted by said engine, that is to say the available motor torque that can be exerted to the maximum by the engine without limitation linked to the target motor torque. This deviation can also deteriorate the trajectory following performance requested at the level of the autonomous vehicle.

This deviation can have several origins. It can be a static deviation and/or a dynamic deviation.

A static deviation is a deviation leading to a variation, more or less, of the motor torque of the engine compared to the requested target motor torque. Thus, the considered engine will provide a motor torque higher or lower than the desired target motor torque. A static deviation can originate from an element external to the engine such as temperature or a failure of an electrical power supply, or an element internal, unpredictable, to the engine such as a disturbance or failure of an element intrinsic to the engine.

A dynamic deviation is inherent in a design of the considered engine, that is to say in a dynamic behavior of the engine. A dynamic deviation is linked to the technology of the redundant engine (whether or not the two engines are independent). Indeed, transmitting and receiving a target motor torque and physically applying it to the two engines is not instantaneous, that is to say there is a constant or variable transmission delay between the two engines. In addition, the dynamic behaviors of the two engines are potentially different due to the dispersion of the electronic components.

Thus, the engine affected by a deviation is deemed to be functional but does not deliver the motor torque expected at a given time. The motor torque is therefore disturbed, deviated or different from the target motor torque. The sum of the motor torques of the two engines, therefore the exerted torque, is different from the target torque. The target torque is therefore not exercised correctly or totally.

It is known to perform a compensation function between the two engines so as to minimize the impact of the deviations affecting the engines and thus ensure that the exerted torque is as much as possible equal to the target torque at a given instant.

The compensation function can be of several types depending on a distribution, that is to say a distribution, of the target torque on the two engines. These compensation functions are mainly based on directional and unilateral compensation between the two engines.

For example, the «master-slave» type compensation function is typically used to compensate for disturbances from one of the engines, called master engine, only. In other words, a compensation flow is determined from the master engine to the slave engine. The deviations between the target torque and the exerted torque caused by poor operation of the slave engine are not compensated by this function, or this compensation strategy. Thus, the «master-slave» type compensation function is not entirely satisfactory.

Other compensation strategies allow the flow of compensation to be changed depending on the disturbance. These types of strategy can lead to management complexity in the directional choice of the compensation between the two engines. In addition, they imply a dependence between the two engines and a residual disturbance not compensated by the two engines. In fact, the management of the directional choice between the two engines is all the more complex by the nature of the disturbance to be compensated for than by the number of signals and variable used to make this choice. Moreover, the choice will be made in relation to the states of the two engines causing an undesirable dependence between the two engines to achieve these compensations. Finally, the directional and unilateral choice between the two engines leads to an arbitration constraint resulting in an incompleteness of the disturbances to be compensated.

The object of the invention is to remedy all these aforementioned drawbacks by proposing a compensation function which is bilaterally exerted, that is to say at the same time from the first engine towards the second engine and vice versa from the second engine towards the first engine.

This invention also makes it possible to highlight the interest of such a bilateral compensation architecture in relation to the challenges of autonomous vehicles. Indeed, this bilateral compensation architecture makes it possible to maintain safe and robust functional performance at the level of the engine redundant globally between the target torque and the exerted torque.

The invention also makes it possible to eliminate potential edge effects, linked to transient overcompensation, induced by this bilateral compensation architecture, for a normal driving mode with a driver.

In addition, the invention makes it possible to impose a desired dynamic behavior on the global redundant engine between the target torque and the exerted torque, making it possible to adjust the physical phenomena of the power steering system.

And finally, this invention makes it possible to be independent of the distribution function. This characteristic of independence between the distribution function and the compensation function makes it possible to separate the objectives between the disturbance rejections for robustness aspects and the failure compensations for contribution aspects to the failure tolerance of the redundant engine system.

To this end, the invention concerns a method for controlling a control motor, said control motor comprising a first engine and a second engine arranged in parallel, said controlling method implementing:
- a distributing step determining a first distributed torque, and a second distributed torque from a target torque;
- a first determining step adding a first compensation request to the first distributed torque so as to determine a first target motor torque;
- a second determining step adding a second compensation request to the second distributed torque so as to determine a second target motor torque;
- a first producing step in which the first engine exerts a first motor torque depending on the first target motor torque;
- a second producing step in which the second engine exerts a second motor torque depending on the second target motor torque;
- the controlling method also comprising a first permission step and/or a second permission step, the first permission step being configured to limit, or respectively authorize, the second request for compensation of a first disturbance, or respectively of a first failure, of the first engine, the second permission step being configured to limit, or respectively authorize, the first compensation request, of a second disturbance, or respectively of a second failure, of the second engine.

According to an implementation mode, the invention comprises one or more of the following characteristics, alone or in a technically acceptable combination.

According to an implementation mode:
- the second compensation request is calculated during a first calculation step as a function of a first compensation deviation then limited during the first permission step as a function of a first limitation threshold, the first compensation deviation being a function of the first motor torque and the first target motor torque, and
- the first compensation request is calculated during a second calculation step as a function of a second compensation deviation then limited during the second permission step as a function of a second limitation threshold, the second compensation deviation being a function of the second motor torque and of the second target motor torque.

According to an implementation mode, the first limitation threshold depends on a maximum motor torque of the second engine.

According to an implementation mode, the second limitation threshold depends on a maximum motor torque of the first engine.

According to an implementation mode:
- the first calculation step comprises an estimate of a theoretical static and/or dynamic behavior determining a first theoretical motor torque as a function of the first target motor torque of the first engine, and
- the second calculation step comprises an estimate of a theoretical static and/or dynamic behavior determining a second theoretical motor torque as a function of the second target motor torque of the second engine.

According to an implementation mode:
- the first calculation step comprises an estimate of a corrected theoretical static and/or dynamic behavior determining a first corrected theoretical motor torque, as a function of the first target motor torque and of the first motor torque of the first engine, and
- the second calculation step comprises an estimate of a corrected static and/or dynamic behavior determining a second corrected theoretical motor torque, as a function of the second target motor torque and of the second motor torque of the second engine.

According to an implementation mode:
- the first calculation step comprises an estimate of a first difference between the first theoretical motor torque and the first corrected theoretical motor torque of the first engine, the first compensation deviation being a function of said first difference; and
- the second calculation step comprises an estimate of a second difference between the second theoretical motor torque and the second corrected theoretical motor torque of the second engine, the second compensation deviation being a function of said second difference.

According to an implementation mode:
- the estimate of the first difference between the first theoretical motor torque and the first corrected theoretical motor torque is calculated on the basis of a value of the first theoretical motor torque at a determined instant delayed according to a transmission delay of the first engine and a value of the first theoretical motor torque corrected at the determined instant delayed according to the transmission delay of the first engine; and
- the estimate of the second difference between the second theoretical motor torque and the second corrected theoretical motor torque is calculated on the basis of a value of the second theoretical motor torque at a determined instant delayed according to a transmission delay of the second engine and a value of the second theoretical motor torque corrected at the determined instant delayed according to the transmission delay of the second engine.

According to an implementation mode:

the estimate of the first difference between the first theoretical motor torque and the first corrected theoretical motor torque is calculated on the basis of a value of the first theoretical motor torque at a determined instant and of a value of the first corrected theoretical motor torque at the determined instant; and the estimate of the second difference between the second theoretical motor torque and the second corrected theoretical motor torque is calculated on the basis of a value of the second theoretical motor torque at a determined instant and of a value of the second corrected theoretical motor torque at the determined instant.

According to an implementation mode, internal parameters of the distribution step, and of the first and second calculation steps are determined so as to impose a desired dynamic behavior of a transfer function of the control motor, between the target torque and an exerted torque, the exerted torque being equal to a sum of the first motor torque and the second motor torque.

According to an implementation mode:

the second compensation request of a first failure of the first engine is authorized only when the deviation between the first target motor torque and the first motor torque of the first engine is greater than a first safety threshold for a first confirmation time of the first failure, the second compensation request of the first failure is then activated for a first reaction time so as to return to a safe state of the control motor, and the first compensation request of a second failure of the second engine is authorized only when the deviation between the second target motor torque and the second motor torque of the second engine is greater than a second safety threshold for a second confirmation time of the second failure, the first compensation request for the second failure is then activated for a second reaction time so as to return to a safe state of the control motor.

According to an implementation mode:

at the end of said first reaction time making it possible to return to a safe state of the control motor, a second request for new distribution is activated by the first permission step authorizing the distribution of the target torque only on the second distributed torque, and in which, the second compensation request is deactivated and the first engine is switched off, or at the end of said second reaction time making it possible to return to a safe state of the control motor, a first request for new distribution is activated by the second permission step authorizing the distribution of the target torque only on the first distributed torque, and in which, the first compensation request is deactivated and the second engine is switched off.

According to one aspect, the invention concerns also a power steering system comprising a control motor, the control motor comprising a first engine and a second engine arranged in parallel, the power steering system being configured to implement a method for controlling the control motor according to any one of the preceding claims.

The invention will be better understood, thanks to the detailed description below, which relates to one or more embodiments according to the present invention, given by way of non-limiting examples and explained with reference to the accompanying schematic drawings, in which:

FIG. 1 is a schematic representation of an embodiment of a functional architecture of a control motor configured to implement the controlling method according to the invention.

FIG. 2 is a sequencing diagram of the functional steps of a method for controlling a control motor according to an embodiment of the invention.

Of course, the invention is not limited to the embodiments described and represented in the accompanying figures. Modifications remain possible, in particular from the point of view of the constitution of the various elements or by substitution of technical equivalents, without departing from the scope of protection of the invention.

An embodiment of the method according to the invention is described below in the context of an application of the method to a power steering system. However, those skilled in the art will understand that this is not limiting and that the method according to the invention can also be applied to any redundant mechatronic system, i.e. comprising at least two distinct engines.

Thus, according to an implementation mode of the method 100 according to the invention, as described below with reference to FIG. 1, the object of said method 100 is the control of a control motor MC of a power steering system not represented in the figures, said control motor MC comprising a first engine M1 and a second engine M2 arranged in parallel, said controlling method 100 implementing, a distribution step determining a first distributed torque E1, and a second distributed torque E2 from a target torque E; the method 100 comprises, for each engine M1, M2, a direct chain for an application of the target torque E, and a compensation chain between the two engines M1, M2.

The control motor receives the target torque E as input and applies an exerted torque F on an element of the power steering system which may be a rack for example, the torque F being equal to the sum of the motor torques respectively exerted by the first engine M1 and by the second engine M2; the control motor may be affected by disturbances or failures respectively affecting the first engine M1 and/or the second engine M2. By convention, a disturbance is considered to be a failure when said disturbance affects the operating safety of the concerned engine. A failure can be partial, or total. An engine affected by a total failure is switched off. In the latter case, the control motor MC only works with a single engine M1, M2.

The direct chain of the first engine M1 comprises:

a step of determining 101 a first target motor torque E1 from the first distributed torque E1 and a compensation request C1 coming from the second engine M2;

a producing step 103 in which the first engine M1 exerts a first motor torque F1 depending on the first target motor torque E1;

The direct chain of the second engine M2 comprises:

a step 102 of determining a second target motor torque E2 from the second distributed torque E'2 and a compensation request C2 coming from the first engine M1;

a producing step 104 in which the second engine M2 exerts a second motor torque F2 depending on the second target motor torque E2;

According to one embodiment, the compensation chain determining the second compensation request C2 coming from the first engine M1 comprises:

a step of estimating a theoretical static and/or dynamic behavior determining a first theoretical motor torque of the first engine M1 from the first target motor torque E1;

a step of estimating a corrected theoretical static and/or dynamic behavior determining a first corrected theoretical motor torque of the first engine M1 from the first target motor torque E1 and from the first motor torque F1;

a step of estimating the disturbance of the first engine M1 calculated from a step of calculating G1 of a first compensation deviation Δ1 as a function of the first motor torque F1 and of the first target motor torque E1; for example, said first compensation deviation Δ1 may be equal to a first difference between the first theoretical motor torque and the first corrected theoretical motor torque of the first engine M1, the second compensation request C2 being determined on the basis of the first compensation deviation Δ1.

A first permission step P1 of the second compensation request, coming from the first engine M1, is implemented; said permission step P1 comprises a limitation of the second compensation request C2, or an authorization of the second compensation request C2, depending on whether it is to compensate for a disturbance D1 of the first engine M1, or to compensate for a failure D1 of the first engine M1.

As indicated above, a failure is distinguished from a disturbance in that the failure cannot be anticipated by the behavior of the system; the disturbance (drop in electrical voltage, increase in temperature, etc.) can thus be anticipated with a specific distribution logic, unlike a failure. The bilateral architecture makes it possible to distinguish the anticipation of a disturbance by a specific distribution from a compensation for a failure. Unlike a disturbance, a failure is based on the use of a criterion defined in particular as a function of a safe threshold and an exceeding time of said safe threshold. Thus, for example, when the deviation between the first target motor torque E1 and the first motor torque F1 of the first engine M1 is greater than a first safety threshold for a first confirmation time, then the disturbance D1 of the first engine M1 is qualified as failure D1 of the first engine M1.

If the above criterion is satisfied, the second compensation request C2 for the failure is then authorized D1, i.e. the second compensation request C2 is activated for a first reaction time so as to return to a safe state of the first engine M1.

By default, the disturbance D1 is processed by a second compensation request C2, which can be limited on the basis of a maximum available capacity of the second engine M2, i.e. the second compensation request C2 is determined so as to remain less than this maximum available capacity of the second engine M2.

The compensation chain determining the first compensation request C1 coming from the second engine M2 comprises:

a step of estimating a second theoretical motor torque of the second engine M2 from the second target motor torque E2;

a step of estimating a second corrected theoretical motor torque of the second engine M2 from the second target motor torque E2 and the second motor torque F2;

a step of estimating the disturbance of the second engine M2 calculated from a step of calculating G2 of a second compensation deviation Δ2 as a function of the second motor torque F2 and of the second target motor torque E2; for example, said second compensation deviation Δ2 may be equal to a second difference between the second theoretical motor torque and the corrected second theoretical motor torque of the second engine M2, the first compensation request C1 being determined on the basis of the second compensation deviation Δ2.

As has been described for the first engine M1, when the deviation between the second target motor torque E2 and the second motor torque F2 of the second engine M2 is greater than a second safety threshold for a second exceeding confirmation time, then the disturbance D2 of the second engine M2 is qualified as a failure D2 of the second engine M2.

If the above criterion is satisfied, the first compensation request C1 for the failure D2 is then authorized, i.e. the first compensation request C1 is activated for a second reaction time so as to return to a safe state of the second engine M2.

By default, the disturbance D2 is processed by a first compensation request C1, which can be limited on the basis of a maximum available capacity of the first engine M1, i.e. the first compensation request C1 is determined so as to remain less than this maximum available capacity of the first engine M1.

More precisely, the step of estimating the theoretical motor torque determines a theoretical motor torque as a function of the target motor torque.

Thus, the theoretical motor torque represents the motor torque which should be produced by an ideal engine representing the engine considered as a function of the target motor torque. The theoretical motor torque depends on the engine technology and its internal parameters. In other words, the theoretical motor torque depends on the global performance of the ideal engine. The theoretical motor torque can be calculated using the equations of a mathematical engine model.

According to one characteristic of the invention, the theoretical motor torque of at least one engine M1, M2 can be represented by a mathematical model of the engine making it possible to describe a frequency response of the engine.

This mathematical model allows filtering of the target motor torque in order to harmonize the frequency spectra between the theoretical motor torque and the theoretical motor torque corrected for an estimate of the disturbance close to reality.

The corrected theoretical motor torque estimation step determines a corrected theoretical motor torque based on the target motor torque and the motor torque.

Thus, the corrected theoretical motor torque represents the motor torque which should be produced by the engine as a function of the target motor torque, being corrected by the motor torque actually exerted by the engine. The corrected theoretical motor torque depends on the engine technology and its internal parameters. In other words, the corrected theoretical motor torque depends on the dynamic performance of the engine and on the motor torque actually achieved.

The corrected theoretical motor torque can be calculated using an engine condition observer. This corrected theoretical motor torque makes it possible to make the controlling method robust and to reduce the noise impacts of the measured information.

A disturbance D1 on the first engine will involve a deviation in static and/or dynamic behavior between the first target motor torque E1 and the first motor torque F1. Another disturbance D2 on the second engine will represent a deviation in static and/or dynamic behavior between the second target motor torque E2 and the second motor torque F2.

Mathematically, it is written on the control motor the following equation:

$$E+D1+D2=F \qquad \text{[Math 1]}$$

With:
E: the target torque received by the control motor MC;
D1, D2: a disturbance respectively affecting the first engine M1 and the second engine M2;
F: the torque exerted by the control motor MC.

The control motor MC according to the invention comprises two distinct engine channels, that is to say independent of each other.

The first engine channel comprises functional blocks which are: the determination step 101, the implementation step 103, the first engine M1, and the calculation step G1, the permission step P1 to limit or authorize the second compensation request C2 coming from the first engine M1 and intended for the second engine M2.

The second engine channel also includes the same functional blocks adapted to the second engine M2: the determination step 102, the production step 104, the first engine M2, and the calculation step G2, the permission step P2 to limit or authorize the first compensation request C1 coming from the second engine M2 and intended for the first engine M1.

Thus, each channel has its own functional blocks, that is, no element of the first channel is common with the second channel. In other words, from a method architecture perspective, there is no common cause of failure between the two engines.

The distribution step D is a step of the method for controlling the control motor that is not part of an engine channel. Preferably, the distribution step can be carried out in an open loop on the target torque E, which makes it possible to share the target torque E on each engine channel. During the distribution step D, a first fraction of the target torque E, corresponding to the first distributed torque E1, and a second fraction of the target torque E corresponding to the second distributed torque E2, are assigned to each engine M1, M2. Usually, the sum of the first fraction E'1 and the second fraction E'2 is equal to the target torque E.

In the controlling method according to the invention, the compensation chain determining the first compensation request C1 coming from the second engine M2 and the compensation chain determining the second compensation request C2 coming from the first engine M1 calculating for each engine M1, M2 a compensation request C2, C1, depending on a compensation deviation $\Delta 1$, $\Delta 2$. In particular, a first compensation deviation $\Delta 1$ is a function of the first motor torque F1 and of the first target motor torque E1, and/or a second compensation deviation $\Delta 2$ is a function of the first motor torque F2 and of the first target motor torque E2. More particularly, the first compensation deviation $\Delta 1$ is a function of a static and/or dynamic behavior deviation between an estimate of the theoretical motor torque and an estimate of the corrected theoretical motor torque of the first engine M1. Likewise, the second compensation deviation $\Delta 2$ is a function of a static and/or dynamic behavior deviation between an estimate of the theoretical motor torque and an estimate of the corrected theoretical motor torque of the second engine M2.

In this way, the compensation chain determining the compensation request coming from the second engine is independent of the compensation chain determining the compensation request coming from the first engine, and vice versa.

The second compensation request C2 coming from the first engine M1 for the second engine M2, and the first compensation request C1 coming from the second engine M2 for the first engine M1, can have non-zero values simultaneously.

Thus, the controlling method 100 according to the invention makes simultaneous or bilateral compensation of the two engines M1, M2. The controlling method 100 does not in any way determine a compensation direction. Each engine receives a compensation request C1, C2, independently of the compensation request C2, C1 applied to the other engine.

In other words, the method seeks to minimize the deviation between the target torque E and the exerted torque F by applying bilateral compensation between the two engines M1, M2. It is sought the solution of the following equation:

$$\min_{C1,C2} \|C1 + C2 + D1 + D2\| \qquad \text{[Math 2]}$$

With:
C1: the compensation request coming from the second engine M2 for the first engine;
C2: the compensation request coming from the first engine M1 for the second engine;
D1, D2: a disturbance respectively affecting the first engine M1 and the second engine M2.

Mathematically, the optimal solution to the previous equation is:

$$C1+C2=-(D1+D2) \qquad \text{[Math 3]}$$

In other words, the optimal technical solution is a bilateral compensation where:

$$\begin{cases} C1 = -D2 \\ C2 = -D1 \end{cases} \qquad \text{[Math 4]}$$

Thus, the controlling method 100 according to the invention makes it possible, thanks to the compensation chain of each engine M1, M2 to achieve optimal operation of the control motor MC in that:
  if the target torque E is lower than a maximum available torque, corresponding to the sum of the maximum motor torques available for each engine M1, M2, the exerted torque F will be equal to the target torque E;
  if the target torque E is greater than the maximum available torque, the exerted torque F will be equal to the maximum available torque.

In other words, the bilateral compensation function or strategy makes it possible to reach a maximum available capacity, or in other words a maximum available power, on the two engines well beyond a method comprising a strategy or a unilateral compensation function, as in the state of the art.

Indeed, a unilateral compensation strategy can only lead to a partial compensation solution on the two engines M1, M2 insofar as it cannot respond to a formal solution of the equation [Math 3]. In addition, these types of unilateral strategy, whatever the structure, require a logic of arbitration on the single choice of compensation between the two engines. In other words, a unilateral compensation strategy cannot achieve exhaustive compensation for all disturbances and failures observable by motor torques or other available data.

Consequently, this bilateral compensation strategy becomes a major issue for autonomous vehicles. The bilateral compensation strategy on a two-engine system makes it possible both to be robust, vis-à-vis disturbances internal and/or external to the engine, and to contribute to the conformity of the trajectory following requested by the autonomous vehicle, in other words a functional trajectory following performance.

Indeed, the functional trajectory following performance required by the autonomous vehicles is directly associated with dysfunctional safety performance. Thus, there is no distinction between functional and dysfunctional performance. In other words, a disturbance or a failure, detectable or not, on one of the engine chains can cause a deviation from the trajectory requested by the autonomous vehicle.

Consequently, standard redundancy only guarantees the availability of the engine for a certain period of time.

A standard redundancy including a bilateral compensation strategy according to the invention can guarantee the compliance of the functional and dysfunctional performance of the trajectory following requested by the autonomous vehicle. Unlike the unilateral strategy, the bilateral compensation strategy, leading to an optimal solution of the equation [Math 3], therefore makes it possible to act globally on the redundant system in order to maintain the functional and dysfunctional trajectory following performance required by the autonomous vehicles.

This bilateral strategy between the two engines, authorizing exhaustive coverage of disturbances and failures observable on the two engines. In other words, the bilateral compensation, which makes it possible to reach the maximum capacity available on the two engines M1, M2, makes it possible to reduce or even cancel deviations between the target motor torques E1, E2, and the motor torques F1, F2 of each engine M1, M2; as soon as they appear on observable data.

Thus, a dependability analysis, based on a methodology called «Failure tree», but also «Analysis of failure modes, their effects and their diagnosis», can show the contribution and/or the benefit of the bilateral compensation on the failure rate calculations relating to the reliability of a redundant system, making it possible to remain operational after a failure, and to guarantee the monitoring of the target torque within the operational limits of the engines.

Thus, any trajectory following target torque requested by the autonomous vehicle will be followed by the control motor, regardless of the failures.

The dual engine design combined with the bilateral compensation strategy are inseparable elements in order to guarantee the functional and dysfunctional performance of the trajectory following at the level of autonomous vehicles.

Moreover, a side effect of bilateral compensation, is an overcompensation, also called rebound or inflation phenomenon on the compensations. This phenomenon can occur when the two engines are physically and/or functionally limited, causing the target motor torques to always be greater than the maximum available motor torques. Deviations associated with overcompensation will increase as the compensation requests, calculated independently between the engines and returned from one engine to the other, will not be limited by what each engine M1, M2 can actually achieve. Indeed, if the engine, receiving the compensation request, is not able to apply it, it will be returned to the original engine and vice versa. Thus, this phenomenon of rebound and compensating inflation between the two engines can last until the end of the physical and/or functional limitation of one of the two engines. This rebound and inflation phenomenon is an unwanted overcompensation.

Indeed, the deviation between the target motor torque E1, E2 and the motor torque F1, F2 of each engine M1, M2 will increase because of unwanted overcompensation requests on the two engines M1, M2. When the motor torque is no longer reduced by a disturbance, these unwanted overcompensation requests are transiently applied to the control motor in the form of a pseudo periodic or aperiodic regime. This transient phenomenon does not cause instability or safety effects on the redundant power steering system. However, the phenomenon of overcompensation can cause a feeling of transient oscillations of the steering wheel torque in the event of normal driving with a driver.

To overcome this rebound or inflation phenomenon in the event of a decrease in the two maximum available motor torques, a physical and functional limitation is necessary on each compensation chain. Indeed, the compensation request will remain limited by what the engine can actually achieve.

Several limitation strategies are feasible depending on the objectives to be achieved on the compensation requests. One of them is to calculate the available capacity of each engine M1, M2, also called the available capacity budget of the engine, by calculating, for each engine M1, M2, a difference between a maximum available motor torque and the distributed torque E1, E2 by the considered engine M1, M2.

This available capacity budget can be formulated according to the speed of the motor, the supply voltage at the motor terminal, the temperature of the motor, or the functional limitations induced by the control motor, and any other available information. Each available capacity budget for an engine M1, M2 will be applied to the calculation of the compensation request C1, C2 for the other engine. Thus, the inflation phenomenon is limited and cannot generate poor torque quality via oscillations during normal driving by a driver.

The limitation of the compensation request can also be achieved by a limitation and/or a functional weighting dependent on the states and variables of the vehicle, the steering system and the control motor.

In the method according to the invention, the limiting steps clip the value respectively of the estimate of the disturbance D1, D2 affecting the first engine M1 and/or the second engine M2 to the value of the available capacity so as to respectively determine the compensation request C1, C2 coming from the second engine and from the first engine. Thus, the compensation request C2 coming from the first engine M1 will be at most equal to the available capacity of the second engine M2 and the compensation request C1 coming from the second engine M2 will be at most equal to the available capacity of the first engine M1.

The method according to the invention limits each compensation request C1, C2 to a value at most equal to the available capacity of the engine M2, M1 for which said compensation request C1, C2 is intended. Thus, in any case, the compensation request C1, C2 can not increase beyond said available capacity. In this way, the phenomenon of overcompensation is avoided.

The method according to the invention provides a simple architecture, guaranteeing reliability, which at the same time makes it possible to achieve optimum operation of the control motor and a pleasant feeling for the driver.

According to one characteristic of the invention, the available capacity of the first engine M1 or of the second engine M2 is a fixed value.

The available capacity is then predefined, for example as a function of the engine technology. In this case, the available capacity of the first engine and/or of the second engine does not take into account the estimate of the disturbance D1, D2 coming from the first and/or the second engine M1, M2. Thus, the architecture of the method is particularly simple and robust.

According to one characteristic of the invention, the available capacity of the second engine depends on an available capacity budget of the second engine.

The available capacity budget of the second engine is determined as a function of its maximum motor torque and its distributed torque. The maximum motor torque depends on the technology of the second engine. There are several ways of determining the maximum motor torque of the second engine, for example by measuring the second motor torque.

According to one characteristic of the invention, the second limitation threshold depends on the available capacity budget of the first engine.

The available capacity budget of the first engine is determined as a function of its maximum motor torque and its distributed torque. The maximum motor torque depends on the technology of the first engine. There are several ways of determining the maximum motor torque of the first engine, for example by measuring the first motor torque.

Thus, the method according to the invention limits the compensation request C1, C2 to a value closest to the maximum acceptable compensation torque, which can be provided by the engine to which the compensation request is applied. In fact, in any case, the compensation request can not increase beyond said threshold. In this way, the phenomenon of unwanted overcompensation is avoided.

According to one characteristic of the invention, the corrected theoretical motor torque is determined in the same temporal reference system as the theoretical motor torque.

Indeed, the corrected theoretical motor torque is determined as a function of the target motor torque E1, E2 and of the exerted motor torque F1, F2. This exerted motor torque F1, F2 is available at the step of producing 103, 104 the engine M1, M2, causing a transmission delay at the level of the estimate of the compensation request C1, C2.

In order to temporally synchronize the corrected theoretical motor torque and the theoretical motor torque, a factor can be applied making it possible to «temporally reset» these two motor torques. This adjustment can be based on the transmission delay by delaying the theoretical motor torque with respect to the corrected theoretical motor torque or on any other information reflecting this desynchronization.

Thus, for example, the estimate of the first difference between the first theoretical motor torque and the corrected first theoretical motor torque is calculated on the basis of a value of the first theoretical motor torque at a determined instant delayed according to a transmission delay of the first engine and a value of the first theoretical motor torque corrected at the determined instant delayed according to the transmission delay of the first engine; and, the estimate of the second difference between the second theoretical motor torque and the second corrected theoretical motor torque is calculated on the basis of a value of the second theoretical motor torque at a determined instant delayed according to a transmission delay of the second engine and a value of the second theoretical motor torque corrected at the determined instant delayed according to the transmission delay of the second engine. In other words, if the determined instant is t, and the transmission delay is r, then the determined time delayed according to the transmission delay will be (t−r).

It is also possible to «predict» the motor torque that is actually exerted, that is to say, estimate the motor torque that will be exerted at the considered time. Thus, for example, the estimate of the first difference between the first theoretical motor torque and the first corrected theoretical motor torque is calculated on the basis of a value of the first motor torque at a determined instant and of a value of the first theoretical motor torque corrected at the determined instant; and the estimate of the second difference between the second theoretical motor torque and the second corrected theoretical motor torque is calculated on the basis of a value of the second theoretical motor torque at a determined instant and of a value of the second corrected theoretical motor torque at the determined instant.

This anticipation of the torque actually exerted makes it possible to achieve a re-phasing of the corrected theoretical dynamic behavior, and to gain in robustness vis-à-vis desynchronization and constant or variable transmission delays between the two engines. This prediction of the torque actually exerted can be calculated using a predictor state observer on each engine.

The step of estimating the theoretical motor torque associated with the step of estimating the theoretical motor torque corrected in the controlling method according to the invention, makes it possible to guarantee a better margin of stability of the control motor between the target torque E1, E2 and the exerted torque F1, F2 within the scope of a bilateral compensation. In other words, the method according to the invention makes it possible to impose and improve the global robustness of the redundant control motor in a bilateral compensation architecture.

According to one characteristic of the invention, the method according to the invention comprises continuous dynamic parameters on each compensation chain. Indeed, each engine channel comprising the direct chain and the compensation chain does not imply any presence of combinatorial logic, non-linear or discontinuous elements.

These continuous dynamic parameters make it possible to impose a desired behavior on the redundant control motor MC between the target torque E and the exerted torque F. The method according to the invention thus contains internal parameters making it possible to impose the global performance of the control motor by associating the distribution step D, the step of estimating the theoretical motor torque and the step of estimating the corrected theoretical motor torque associated, as indicated above, with the calculation step G1, G2 respectively compensation deviations Δ1, Δ2 for each engine M1, M2. The optimization of the settings of the parameters of the bilateral compensations, in order to impose a desired dynamic behavior between the target torque E and the exerted torque F, can be carried out in the form of an optimization under constraint in order to guarantee the stability of the control motor as a function of the exerted torque F1, F2, of the target torque E1, E2, delays in the application of compensations C1, C2 and disturbances on each engine. This architecture therefore makes it possible to return to conventional servo analyzes based on the various inputs and outputs of the redundant control motor.

The advantage of coming back to classic servo analyzes is to be able to control a robust desired behavior on the basis of two known redundant engines M1, M2. A direct application of this two-way compensation strategy is to amplify the high frequency gains between the target torque E and the exerted torque F in order to release friction on the power steering system. Thus, as with a «dither» method, the friction phenomena within the power steering system are reduced.

The method according to the invention decreases the negative effects on the steering wheel feel associated with the friction of the power steering system, and also, improves the efficiency with respect to the sizing of the power steering system.

To deal with a failure of the first M1 or the second M2 engine:
- the second compensation request C2 of a first failure of the first engine M1 is authorized only when the deviation between the first target motor torque E1 and the first motor torque F1 of the first engine M1 is greater than a first safety threshold for a first confirmation time of the first failure, the second compensation request C2 of the first failure is then activated during a first reaction time so as to return to a safe state of the control motor MC, and
- the first compensation request C1 of a second failure of the second engine M2 is authorized only when the deviation between the second target motor torque E2 and the second motor torque F2 of the second engine M2 is greater than a second safety threshold for a second confirmation time of the second failure, the first compensation request C1 for the second failure is then activated for a second reaction time so as to return to a safe state of the control motor MC.

Thus, according to an implementation mode of the method according to the invention:
- at the end of said first reaction time making it possible to return to a safe state of the control motor MC, a second request for a new distribution ND2 is activated by the first permission step P1 authorizing the distribution of the target torque E only on the second distributed torque E2, and in which the second compensation request C2 is deactivated and the first engine M1 is switched off, or
- at the end of said second reaction time making it possible to return to a safe state of the control motor MC, a first request for a new distribution ND1 is activated by the second permission step P2 authorizing the distribution of the target torque E only on the first distributed torque E1, and in which the first compensation request C1 is deactivated and the second engine M2 is switched off.

According to one aspect, the invention also concerns a power steering system comprising a control motor MC, the control motor MC comprising a first engine M1 and a second engine M2 arranged in parallel, the power steering system being configured to implement a controlling method 100 of the control motor MC according to any one of the preceding claims.

The invention claimed is:

1. A method for controlling of a control motor, the control motor comprising a first engine and a second engine arranged in parallel, the controlling method implementing:
   a distribution step determining a first distributed torque, and a second distributed torque from a target torque;
   a first determination step adding a first compensation request to the first distributed torque so as to determine a first target motor torque;
   a second determination step adding a second compensation request to the second distributed torque so as to determine a second target motor torque;
   a first production step in which the first engine exerts a first motor torque depending on the first target motor torque;
   a second production step in which the second engine exerts a second motor torque depending on the second target motor torque;
   the controlling method also comprising a first permission step and/or a second permission step, the first permission step being configured to limit the second compensation request of a first disturbance, or to authorize the second compensation request of a first failure, of the first engine, the second permission step being configured to limit the first compensation request of a second disturbance, or to authorize the first compensation request of a second failure, of the second engine.

2. The controlling method according to claim 1, wherein:
   the second compensation request is calculated during a first calculation step as a function of a first compensation deviation then limited during the first permission step according to a first limitation threshold, the first compensation deviation being a function of the first motor torque and of the first target motor torque, and
   the first compensation request is calculated during a second calculation step as a function of a second compensation deviation then limited during the second permission step according to a second limitation threshold, the second compensation deviation being a function of the second motor torque and of the second target motor torque.

3. The controlling method according to claim 2, wherein the first limitation threshold depends on a maximum motor torque of the second engine.

4. The controlling method according to claim 2, wherein the second limitation threshold depends on a maximum motor torque of the first engine.

5. The controlling method according to claim 2, wherein:
   the first calculation step comprises an estimate of a theoretical static and/or dynamic behavior determining a first theoretical motor torque as a function of the first target motor torque of the first engine, and
   the second calculation step comprises an estimate of a theoretical static and/or dynamic behavior determining a second theoretical motor torque as a function of the second target motor torque of the second engine.

6. The controlling method according to claim 2, wherein:
   the first calculation step comprises an estimate of a corrected theoretical static and/or dynamic behavior determining a first corrected theoretical motor torque, as a function of the first target motor torque and of the first motor torque of the first engine, and
   the second calculation step comprises an estimate of a corrected static and/or dynamic behavior determining a second corrected theoretical motor torque, as a function of the second target motor torque and of the second motor torque of the second engine.

7. The controlling method according to claim 5, wherein:
   the first calculation step comprises an estimate of a first difference between the first theoretical motor torque and the first corrected theoretical motor torque of the first engine, the first compensation deviation being a function of the first difference; and
   the second calculation step comprises an estimate of a second difference between the second theoretical motor torque and the second corrected theoretical motor torque of the second engine, the second compensation deviation being a function of the second difference.

8. The controlling method according to claim 7, wherein:
   the estimate of the first difference between the first theoretical motor torque and the first corrected theoretical motor torque is calculated on the basis of a value of the first theoretical motor torque at a determined instant delayed according to a transmission delay of the first engine and a value of the first theoretical motor torque corrected at the determined instant delayed according to the transmission delay of the first engine; and the estimate of the second difference between the second theoretical motor torque and the second corrected theoretical motor torque is calculated on the basis of a value of the second theoretical motor torque at a determined instant delayed according to a transmission delay of the second engine and a value of the second theoretical motor torque corrected at the determined instant delayed according to the transmission delay of the second engine.

9. The controlling method according to claim 7, wherein:
the estimate of the first difference between the first theoretical motor torque and the first corrected theoretical motor torque is calculated on the basis of a value of the first theoretical motor torque at a determined instant and of a value of the first corrected theoretical motor torque at the determined instant; and the estimate of the second difference between the second theoretical motor torque and the second corrected theoretical motor torque is calculated on the basis of a value of the second theoretical motor torque at a determined instant and of a value of the second corrected theoretical motor torque at the determined instant.

10. The controlling method according to claim 1, wherein internal parameters of the distribution step, and of the first and second calculation steps are determined so as to impose a desired dynamic behavior of a transfer function of the control motor, between the target torque and an exerted torque, the exerted torque being equal to a sum of the first motor torque and the second motor torque.

11. The controlling method according to claim 2, wherein:
the second compensation request of a first failure of the first engine is authorized only when the deviation between the first target motor torque and the first motor torque of the first engine is greater than a first safe threshold during a first confirmation time of the first failure, the second compensation request of the first failure is then activated for a first reaction time so as to return to a safe state of the control motor, and the first compensation request of a second failure of the second engine is authorized only when the deviation between the second target motor torque and the second motor torque of the second engine is greater than a second safety threshold during a second confirmation period of the second failure, the first compensation request of the second failure is then activated for a second reaction period so as to return to a safe state of the control motor.

12. The controlling method according to claim 11, wherein:
at the end of the first reaction time making it possible to return to a safe state of the control motor, a second request for a new distribution is activated by the first permission step authorizing the distribution of the target torque only on the second distributed torque, and in which the second compensation request is deactivated and the first engine is switched off, or at the end of the second reaction time making it possible to return to a safe state of the control motor, a first request for a new distribution is activated by the second permission step authorizing the distribution of the target torque only on the first distributed torque, and in which the first compensation request is deactivated and the second engine is switched off.

13. A power steering system comprising a control motor, the control motor comprising a first engine and a second engine arranged in parallel, the power steering system being configured to implement a method for controlling the control motor according to claim 1.

* * * * *